US008424180B2

(12) United States Patent
Wallek

(10) Patent No.: US 8,424,180 B2
(45) Date of Patent: Apr. 23, 2013

(54) WEDGE ANCHOR SETTING APPARATUS

(76) Inventor: Thomas Allan Wallek, Reno, NV (US)

( * ) Notice: Subject to any disclaimer, the term of this patent is extended or adjusted under 35 U.S.C. 154(b) by 455 days.

(21) Appl. No.: 12/800,964

(22) Filed: May 26, 2010

(65) Prior Publication Data

US 2010/0236040 A1 Sep. 23, 2010

Related U.S. Application Data

(63) Continuation-in-part of application No. 12/009,237, filed on Jan. 17, 2008, now Pat. No. 7,814, 631.

(60) Provisional application No. 61/217,187, filed on May 26, 2009, provisional application No. 60/881,647, filed on Jan. 22, 2007.

(51) Int. Cl.
*B23P 11/00* (2006.01)

(52) U.S. Cl.
USPC ............................ 29/270; 29/271; 81/177.85

(58) Field of Classification Search .................... 29/270, 29/278, 280, 282, 263, 271, 281; 81/177.1, 81/177.85; 173/29
See application file for complete search history.

(56) References Cited

U.S. PATENT DOCUMENTS

| | | | | |
|---|---|---|---|---|
| 4,890,779 | A * | 1/1990 | Giannuzzi | 227/139 |
| 6,354,177 | B2 * | 3/2002 | Peters | 81/439 |
| 7,121,357 | B1 * | 10/2006 | Raimondi | 173/1 |
| 7,290,470 | B1 * | 11/2007 | Peters | 81/439 |
| 7,814,631 | B2 * | 10/2010 | Wallek | 29/254 |
| 2008/0173141 | A1 * | 7/2008 | Wallek | 81/177.1 |
| 2010/0236040 | A1 * | 9/2010 | Wallek | 29/270 |

* cited by examiner

*Primary Examiner* — Lee D Wilson

(57) ABSTRACT

Objects of the present invention provide an attachment for power tools that places and set wedge anchors. One embodiment of the present invention is directed to a new and improved attachment apparatus for a rotary-hammer type drill, the attachment including a first anchor setting end, a second attachment end, and a handle portion connecting the setting end to the attachment end. The attachment apparatus can be efficiently and easily mounted to the rotary-hammer type drill to simplify the installation of wedge anchors.

16 Claims, 2 Drawing Sheets

WEDGE ANCHOR SETTING APPARATUS

CROSS-REFERENCE TO RELATED APPLICATIONS

This application is a continuation-in-part of prior application Ser. No. 12/009,237, filed Jan. 17, 2008 now U.S. Pat. No. 7,814,631, entitled EXPANSION ANCHOR SETTING APPARATUS, which claims priority from provisional application Ser. No. 60/881,647, filed Jan. 22, 2007, the contents of which are incorporated herein by reference. This application further claims priority to U.S. provisional application No. 61/217,187 filed on May 26, 2009, the entire contents of which are hereby incorporated by reference.

FIELD OF INVENTION

This invention relates to a wedge anchor setting apparatus, and more particularly to an attachment for power tools that places and sets wedge anchors.

BACKGROUND

Power tools are conventionally used in the installation of anchors in substantially rigid materials. One well-known use of these power tools is in the installation process of wedge anchors in concrete, masonry, and rock. When such an anchor is placed, a power tool is used in a rotary hammer manner to impart combined rotational and axial impact blows to a particular area of material. This is typically accomplished with a rotary hammer drill using a drilling bit structured for drilling in such material. When a sufficiently sized hole has been drilled out of the rigid material, the rotary hammer drill is set aside and the anchor is placed and set. The common practice within the construction industry for placing and setting the anchor is to use a handheld hammer to push the wedge anchor into the drilled hole. This is a labor-intensive effort and is somewhat dangerous and difficult especially when attempting to install anchors overhead off of ladders. This can be especially difficult if the anchor is being placed in a ceiling portion as the need to look up can impair an operator's balance and orientation.

In the installation of wedge anchors, there is no way of protecting the hand that is holding and placing the wedge anchor in the drilled hole while it is being driven with the hammer. Installation of wedge anchors still requires the operator to set aside the rotary hammer, balance themselves, and manually hammer the wedge anchor to set it. In addition, to the physical demands imparted by this manual hammering, it can be extremely difficult to set such anchors where the working area is constrained and limited area exists for the workman to both hold the wedge anchor and swing the hammer.

Additionally, to achieve a high quality of attachment of the wedge anchor to the concrete or masonry structure, it is necessary that the wedge anchor be fully driven to the proper depth in the concrete or masonry. This is necessary to assure the performance margins of the anchor are attained. Such margins can only be achieved when the wedge anchor is fully and properly positioned within the concrete. Larger wedge anchors require considerably more energy and force to properly position them in the concrete. Because of this requirement for increased force, the wedge anchor can be easily damaged by glancing blows while hand hammering. This force requirement increases the difficulty of installation in difficult conditions and anchor failure can often occur because of improper and inadequate installation.

Therefore, as already stated, the proper installation and placement of the wedge anchor is necessary for the proper performance of the wedge anchor. The current practice and method of installing wedge anchors is physically exhausting and dangerous, especially when accomplished while working from ladders or overhead, the location where this type of anchor is most often used. These and other problems in the conventional art are addressed by embodiments of the present invention.

SUMMARY

Embodiments of the present invention provide an attachment for power tools that places and sets wedge anchors. In one embodiment, the wedge anchor setting attachment includes a first end structured to correspond to a setting portion of a wedge anchor, a second end structured to correspond with the receiving chuck of a power tool, and a handle portion connecting the first end to the second end. The handle portion further includes a sliding portion that is arranged to extend over at least a portion of the first end to stabilize the wedge anchor placed in the first end.

BRIEF DESCRIPTION OF DRAWINGS

These and other features and advantages of the present invention are best understood by reading the following detailed description, taken together with the drawings wherein.

DETAILED DESCRIPTION

Figure 1:
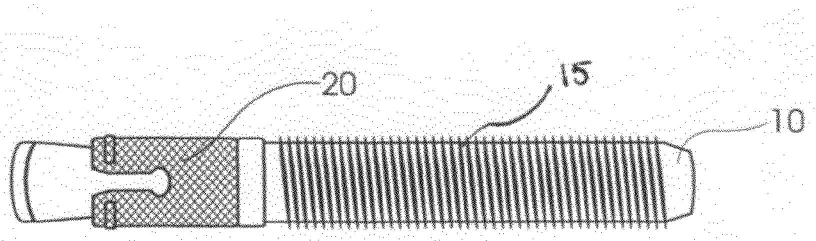
FIG. 1 is a partial cross-sectional view of a conventional concrete wedge anchor.

As discussed above, it is recognized that there is a need to hold the anchor onto the end of the setting device, freeing one of the workers hands so that he can maintain his balance and physical control while working from a ladder or overhead. Being able to free one hand has its obvious advantages, but none greater then the safety of the workman. The labor associated with using a mechanical installation method for expansion anchors allows for increased production with less energy expended by the worker. Safety of the worker is greatly improved. Accidents and costs associated with injuries have become a large issue in the construction industry. Profitability is enhanced by instituting practices and methods that improve conditions. Though this may seem like a small matter, hundreds of millions of these types of anchors are installed globally each year. An improved installation method is long overdue and desired by the workman.

To address these and other problems, embodiments of the present invention are directed to an attachment for power tools that places and sets wedge anchors. Wedge anchors are a type of expansion anchor used to securely position an anchor device in concrete, masonry, or other substantially rigid substrates. Some of these embodiments are described below in detail, and in addition, some specific details are shown for purposes of illustrating the inventive principles. However, numerous other arrangements may be devised in accordance with the inventive principles of this patent disclosure. Thus, while the present invention is described in conjunction with the specific embodiments illustrated in drawings, it is not limited to these embodiments or drawings. Rather, it is intended to cover alternatives, modifications, and equivalents that come within the scope and spirit of the inventive principles set out in the appended claims. Further, well-known processes have not been described in detail in order not to obscure the present invention. Thus, the inventive principles are not limited to the specific details herein.

One embodiment of the present invention is an attachment for a rotary-hammer drill. The attachment may be installed on the hammer after the hole has been drilled to receive the wedge anchor. This may necessitate the removal of the drill bit and installation of the setting tool. In another embodiment of the present invention, the setting tool may have the additional advantage of holding the anchor within its sliding receiver for ease of installation vertically and horizontally. The sliding receiver stabilizes the anchor so that the anchor can easily be installed in the previously drilled hole. This method of installation allows the workman to keep one hand free once the anchor has been placed within the sliding receiver.

Another object and advantage of this embodiment is that the setting tool can spin freely in the rotary position without damaging the threads of the anchor.

Another object of the present invention is the provision of a new and improved attachment apparatus for a rotary-hammer type drill and methods of use for the attachment apparatus with rotary-hammer type drills, where the attachment apparatus can be efficiently and easily mounted to the drill to simplify the installation of wedge type anchors.

FIG. 1 is a partial cross-sectional view of a conventional concrete wedge anchor. Referring to FIG. 1, the wedge anchor 10 includes a sliding clip 20, and a threaded portion 15. In a typical setting application, the wedge anchor 10 is installed in a pre-drilled hole that has substantially the same diameter as the wedge anchor 10. The clip 20 is slightly larger then the pre-drilled hole 60 and requires that a significant force be applied to the threaded end of the wedge anchor 10 to drive the anchor into the substrate 70.

Figure 2:
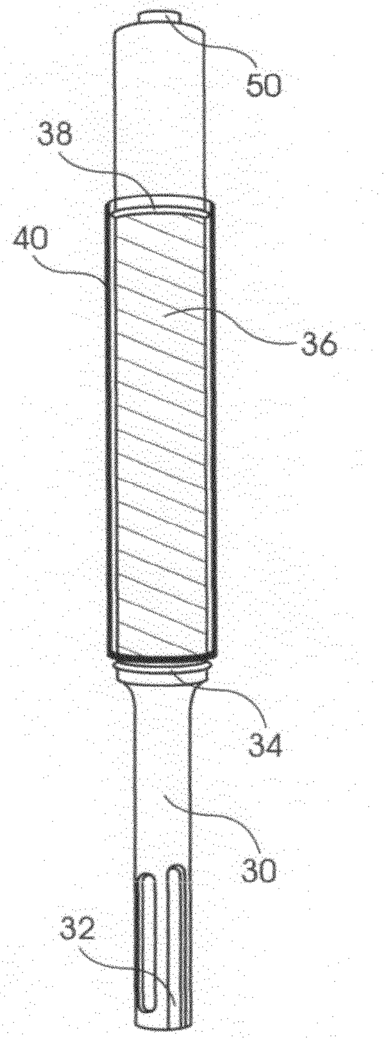
FIG. 2 is a partial cross-sectional view of a setting apparatus with a sliding receiver in a first position according to an embodiment of the present invention.
Figure 3:
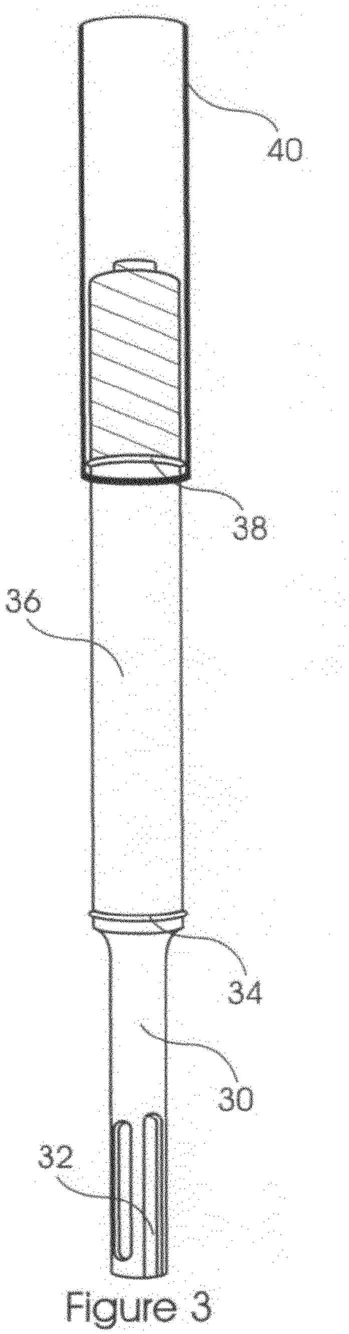
FIG. 3 is a partial cross-sectional view of a setting apparatus illustrated in FIG. 2 with the sliding receiver in the second position.

FIGS. 2 and 3 show cross-sectional views of a setting apparatus according to an embodiment of the present invention. FIG. 2 is a partial cross-sectional view of the setting apparatus with a sliding receiver in the first position and FIG. 3 is a partial cross-sectional view of the setting apparatus with the sliding receiver in a second position.

Figure 4:
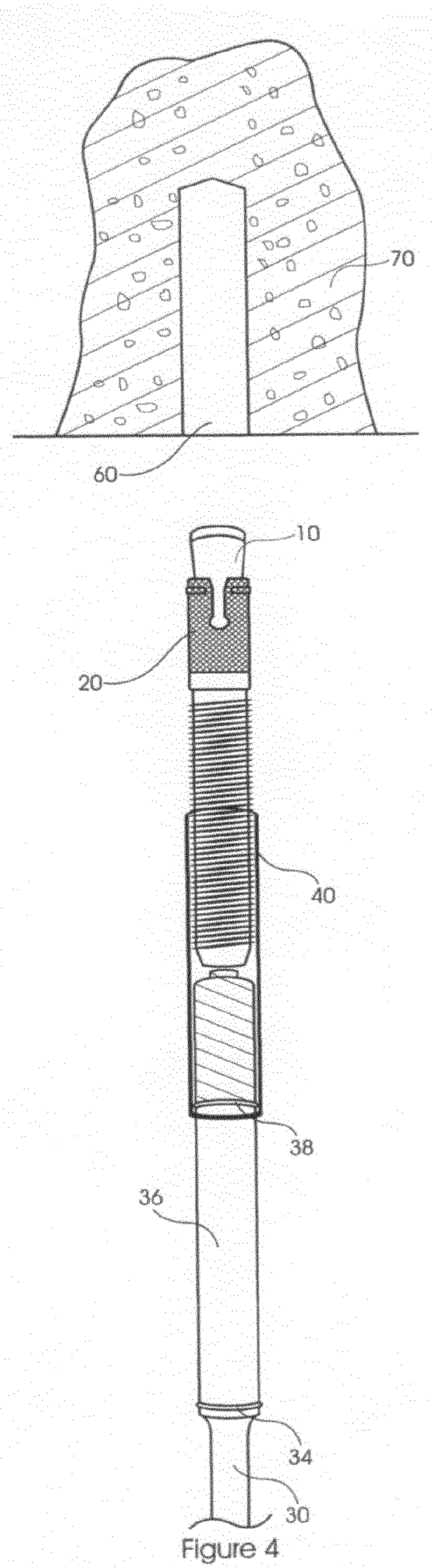
FIG. 4 is a partial cross-sectional view of the apparatus illustrated in FIG. 2 as installed in a rotary-hammer drill with a wedge anchor placed in the sliding receiver and ready for insertion in a pre-drilled substrate.
Figure 5:
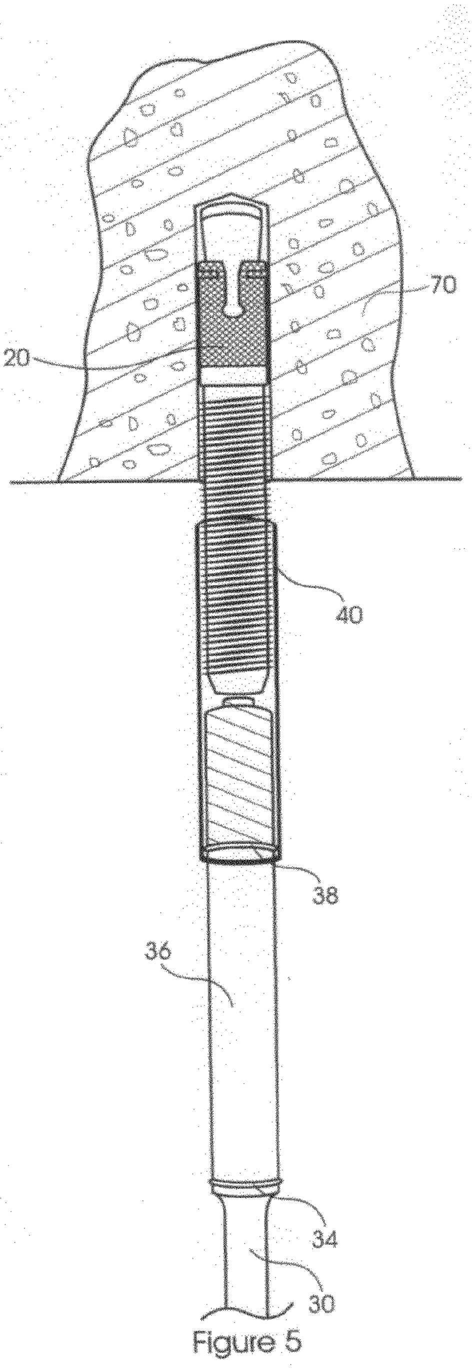
FIG. 5 is a partial cross-sectional view of the setting apparatus illustrated in FIG. 4 with wedge anchor installed in the substrate.

Referring to FIGS. 2 and 3, the setting apparatus 30 includes a driving end 50, an attachment end 32, and a handle portion 36 connecting the driving end 50 to the attachment end 32. The driving end 50 may be structured to have a diameter that is smaller than the diameter of the threaded portion of a wedge anchor, as shown in FIGS. 4 and 5. The actual diameter of the driving end may be varied between setting apparatuses so that a variety of different sized wedge anchors may be set. In other embodiments, the driving end 50 may be expandable so that one setting apparatus 30 may be used on a variety of different sized wedge anchors. One embodiment of such a structure may include a plurality of driving tips that fit within one another such that an operator may place or remove one or more tips to obtain a driving end 50 that corresponds to a desired wedge anchor. In another embodiment, the driving end itself may be adjustable so that the diameter of the driving end can be adjusted to fit with multiple differently sized wedge anchors. For example, the driving end 50 may be rotated along a threaded track to expand or shrink the portion of the first end that interacts with the wedge anchor. A locking mechanism may further be used to lock the driving end 50 at a specific setting along the threaded track. The driving end 50 may further be constructed of a hardened metal to withstand the repeated impacts during wedge anchor installations.

The attachment end 32 of the setting apparatus 30 is structured to fit with a chuck system of a power tool, such as a rotary-hammer drill or the like so that the setting apparatus can be securely held by the power tool. The attachment end 32 may include various indentations or protrusions to fit with any standardized chuck system used with power tools.

The handle portion 36 of the setting apparatus 30 connects the driving end 50 to the attachment end 32. The handle portion 36 may further include a sliding receiver 40 that moves back and forth along the longitudinal axis of the setting apparatus 30 with movement limited by retaining ring 34 for the full back position and a second retaining ring 38 for the full forward position (shown in FIG. 3). The sliding receiver 40 slides along the longitudinal axis of the setting apparatus 30 and may be held in position by friction with the second ring 38. The first and second retaining rings 34 and 38 rest in slots cut in the shaft of the setting apparatus 30 at appropriate positions to allow for full movement of the sliding receiver 40. The sliding receiver 40 may further slide forward and back with enough friction between the second retaining ring 38 and the sliding receiver 40 to maintain any position along its range of movement. This feature may help to accomplish the objective of holding a wedge anchor prior to inserting the wedge anchor into the pre-drilled hole in the substrate.

In other embodiments, the handle portion 36 of the setting apparatus 30 may include only a metal shaft integrally connecting the driving end 50 to the attachment end 32. In other embodiments, the handle portion 36 may include a rotational receiver similar to the sliding receiver 40 shown in FIGS. 2 and 3, but without the sliding feature. That is, the rotational receiver may be held in one position while the shaft of the setting apparatus 30 freely rotates beneath it.

FIGS. 4 and 5 illustrate the setting apparatus 30 shown in FIGS. 2 and 3 as installed in a rotary-hammer drill with a wedge anchor placed in the sliding receiver. FIG. 4 is a partial cross-sectional view of the setting apparatus as installed in a rotary-hammer drill with a wedge anchor placed in the sliding receiver and ready for insertion in a pre-drilled substrate and in FIG. 5 is a partial cross-sectional view of the setting apparatus with the wedge anchor installed in the substrate.

Referring to FIGS. 4 and 5, a hole 60 is drilled in a substrate 70 using a rotary-hammer drill and drill bit. The drill bit is then removed and the setting apparatus 30 is installed and secured in the rotary-hammer drill (not shown). The sliding receiver 40 is positioned forward as shown in FIG. 3. The wedge anchor 10 is placed within the sliding receiver 40 as shown in FIG. 4. The wedge anchor 10 is then inserted into the pre-drilled hole 60 with the setting apparatus 30 and the rotary-hammer drill is then turned on. The pressure and mechanical action applied to the wedge anchor 10 from the rotary-hammer drill drives the wedge anchor 10 into the pre-drilled hole 60 to the prescribed depth. When the wedge anchor 10 is fully set as shown in FIG. 5, the setting apparatus 30 is withdrawn from the anchor and the installation of the wedge anchor 10 is complete. After the setting apparatus 30 has been removed, washers, nuts, or other fasteners may be attached to the threads 15 of the wedge anchor and tightened until the clip 20 fully grabs the substrate and proper anchorage is achieved of the wedge anchor 10.

What is claimed is:

1. A wedge anchor setting apparatus, comprising:

a first end structured to correspond to a setting portion of a wedge anchor;

a second end structured to correspond with a receiving chuck of a power tool;

a handle portion connecting the first end to the second end, wherein the handle portion further comprises a sliding portion configured to extend over at least a portion of the first end of the apparatus in a forward slide position;

at least one first retaining device configured to prevent the sliding portion from sliding past the forward slide position; and at least one second retaining device configured to prevent the sliding portion from sliding past the rear slide position, wherein the first and second retaining devices are retaining rings that respectively correspond to first and second indentations in the handle portion of the apparatus.

2. The apparatus of claim 1, wherein the sliding portion is configured to at least partially cover a wedge anchor positioned on the first end of the apparatus in the forward slide position.

3. The apparatus of claim 1, wherein the sliding portion is configured to expose the first end of the apparatus in a rear slide position.

4. The apparatus of claim 1, wherein the sliding portion is configured to engage the handle portion to produce friction sufficient to maintain the position of the sliding portion relative to the handle portion.

5. The apparatus of claim 1, wherein the first end is configured to have a diameter that is smaller than the diameter of the threaded portion of the wedge anchor.

6. The apparatus of claim 5, wherein a portion of the first end has a cross-sectional area smaller than a cross-sectional area of the handle portion.

7. The apparatus of claim 1, wherein the first end is configured to have an adjustable diameter to fit with a plurality of different sized wedge anchors.

8. The apparatus of claim 1, wherein the first end includes a plurality of driving end tips.

9. The apparatus of claim 8, wherein at least two of the plurality of driving end tips include different sized cross-sectional areas that correspond to different sized wedge anchors.

10. The apparatus of claim 9, wherein the plurality of driving tips nest within each other from a largest-sized driving tip to a smallest-sized driving tip.

11. The apparatus of claim 8, wherein the plurality of driving end tips respectively fit over a portion of the first end of the apparatus.

12. The apparatus of claim 1, wherein the second end includes indentations corresponding to a fastening system of the receiving chuck of the power tool.

13. The apparatus of claim 12, wherein the second end is configured to correspond to the receiving chuck of a rotary-hammer drill.

14. A wedge anchor setting apparatus, comprising:

a substantially cylindrical shaft, the shaft including:

a body portion including a first substantially circular slot and a second substantially circular slot spaced apart from the first slot by a predetermined distance, a driving end having a cross-sectional area smaller than a cross-sectional area of the body portion, the driving end configured to fit within a threaded portion of a wedge anchor, and an attachment end configured to be engaged by a receiving chuck of a rotary-hammer drill, the attachment end being positioned opposite the driving end with the body portion being interposed therebetween;

a sliding sleeve covering at least a section the body portion of the shaft, the sliding sleeve configured to cover at least a portion of the driving end to support a wedge anchor disposed on the driving end of the apparatus in a first slide position and configured to expose the driving end of the apparatus in a second slide position, wherein the sliding sleeve engages the shaft to maintain the position of the sliding sleeve relative to the shaft;

a first retaining ring positioned in the first slot in the body portion of the shaft, the first retaining ring configured to prevent the sliding sleeve from sliding past the first slide position; and a second retaining ring positioned in the second slot in the body portion of the shaft, the second retaining ring configured to prevent the sliding sleeve from sliding past the second slide position.

15. The apparatus of claim 14, wherein the driving end of the shaft includes hardened steel.

16. The apparatus of claim 14, wherein the attachment end of the shaft includes at least one of a protrusion or recess to correspond to an attachment system of the receiving chuck of the rotary-hammer drill.

* * * * *